US008205000B2

(12) United States Patent
Chang et al.

(10) Patent No.: US 8,205,000 B2
(45) Date of Patent: *Jun. 19, 2012

(54) NETWORK MANAGEMENT WITH PLATFORM-INDEPENDENT PROTOCOL INTERFACE FOR DISCOVERY AND MONITORING PROCESSES

(75) Inventors: Ching-Jye Chang, Austin, TX (US); Lorin Evan Ullman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/174,756

(22) Filed: Jul. 17, 2008

(65) Prior Publication Data

US 2008/0301267 A1    Dec. 4, 2008

Related U.S. Application Data

(63) Continuation of application No. 09/737,725, filed on Dec. 15, 2000, now Pat. No. 7,418,513.

(51) Int. Cl.
*G06F 15/177* (2006.01)
(52) U.S. Cl. ........ 709/230; 709/200; 709/232; 370/235; 370/401
(58) Field of Classification Search ............ 709/230, 709/232
See application file for complete search history.

(56) References Cited

U.S. PATENT DOCUMENTS

| | | | |
|---|---|---|---|
| 5,049,873 A | 9/1991 | Robins et al. | |
| 5,257,369 A | 10/1993 | Skeen et al. | |
| 5,317,568 A * | 5/1994 | Bixby et al. | 370/401 |
| 5,473,608 A * | 12/1995 | Gagne et al. | 370/401 |
| 5,517,622 A * | 5/1996 | Ivanoff et al. | 709/232 |
| 5,544,314 A | 8/1996 | Fuchsreiter et al. | |
| 5,568,471 A | 10/1996 | Hershey et al. | |
| 5,581,708 A * | 12/1996 | Iijima | 710/11 |
| 5,592,530 A | 1/1997 | Brockman et al. | |
| 5,787,248 A * | 7/1998 | Zupcsics et al. | 709/230 |
| 5,790,796 A | 8/1998 | Sadowsky | |
| 5,812,826 A | 9/1998 | McLain, Jr. | |
| 5,862,338 A | 1/1999 | Walker et al. | |
| 5,892,910 A | 4/1999 | Safadi | |
| 5,958,010 A | 9/1999 | Agarwal et al. | |
| 5,958,018 A | 9/1999 | Eng et al. | |
| 5,978,841 A | 11/1999 | Berger | |
| 6,061,603 A | 5/2000 | Papadopoulos et al. | |
| 6,101,545 A | 8/2000 | Balcerowski | |

(Continued)

OTHER PUBLICATIONS

"Method and System for Managing Network Devices via the Web", Disclosure #41452, Research Disclosure, pp. 1-7, Oct. 1, 1998.

(Continued)

*Primary Examiner* — Wing Chan
*Assistant Examiner* — Tesfay Yohannes
(74) *Attorney, Agent, or Firm* — Yee & Associates, P.C.; Jeffrey S. LaBaw

(57) ABSTRACT

A set of devices of a distributed data processing system and a protocol are selected to complete an action received by a requesting application. The set of devices and protocol are selected based on whether the protocol supports the type of the requested action; whether the protocol is an allowable/supported protocol for each device along a topology mapped logical route for completing the requested action; and assigned priorities of each protocol. The topology mapped logical route is then used for completing the requested action using the selected protocol. The requesting application may use the action in accordance with the selected allowable supported protocol, e.g., to monitor or discover the target device.

14 Claims, 11 Drawing Sheets

U.S. PATENT DOCUMENTS

| | | | |
|---|---|---|---|
| 6,108,782 | A | 8/2000 | Fletcher et al. |
| 6,134,581 | A | 10/2000 | Ismael et al. |
| 6,178,449 | B1 | 1/2001 | Forman et al. |
| 6,189,046 | B1 | 2/2001 | Moore et al. |
| 6,205,148 | B1 | 3/2001 | Takahashi et al. |
| 6,208,952 | B1 | 3/2001 | Goertzel et al. |
| 6,223,149 | B1 | 4/2001 | Margulis et al. |
| 6,226,702 | B1 | 5/2001 | Yakashiro |
| 6,243,589 | B1 * | 6/2001 | Novel .................. 455/466 |
| 6,333,931 | B1 | 12/2001 | La Pier et al. |
| 6,363,421 | B2 | 3/2002 | Barker et al. |
| 6,408,342 | B1 | 6/2002 | Moore et al. |
| 6,434,120 | B1 | 8/2002 | Natarajan et al. |
| 6,496,859 | B2 | 12/2002 | Roy et al. |
| 6,539,422 | B1 | 3/2003 | Hunt et al. |
| 6,584,490 | B1 * | 6/2003 | Schuster et al. .......... 709/200 |
| 6,598,174 | B1 | 7/2003 | Parks et al. |
| 6,625,662 | B1 | 9/2003 | Satoh et al. |
| 6,636,895 | B1 | 10/2003 | Li et al. |
| 6,647,400 | B1 | 11/2003 | Moran |
| 6,757,250 | B1 * | 6/2004 | Fayad et al. ............. 370/235.1 |
| 6,760,777 | B1 | 7/2004 | Agarwai et al. |
| 6,768,722 | B1 * | 7/2004 | Katseff et al. ............. 370/260 |
| 6,782,414 | B1 | 8/2004 | Xue et al. |
| 6,788,980 | B1 | 9/2004 | Johnson |
| 7,418,513 | B2 | 8/2008 | Chang et al. |
| 2002/0129208 | A1 | 9/2002 | Barroso et al. |
| 2002/0161848 | A1 | 10/2002 | Willman et al. |

OTHER PUBLICATIONS

Yoshihara et al., "Dynamic Polling Scheme Based on Time Variation of Network Management Information Values", Proc. of 6th IFIP/IEEE Intl. Symposium on Integrated Network Management, pp. 141-154, May 1999.

Internet Key Exchange Security Protocol, pp. 1-43. www.jasien.gda.pl/cisco/isakmp.htm.

Hartroth et al., "From Gophers to Ants—A Case for Mobile Agent Families", Enabling Technologies: Infrastructure for Collaborative Enterprises, 1998. (WET ICE '98) Proceedings, Seventh IEEE, pp. 1-6.

Baum et al., "Analysis of Command Operation Procedures (COP's) for Reliable Data Transfer in the European space Data Network", IEEE 1991, pp. 233-240.

Leppinen et al., "Java- and CORBA-Based Network Management", vol. 30, Issue 6, Jun. 1997, pp. 83-87.

Hatefi et al., "A New Framework for Secure Network Management", Computer Communications and Networks, IEEE 1997, Proceedings., Sixth International Conference on Sep. 22-25, 1997, pp. 510-515.

O'Guin et al., "Application of Virtual Private Networking Technology to Standards-Based Management Protocols Across Heterogeneous Firewall-Protected Networks", Military Communications Conference Proceedings, 1999. MILCOM 1999. IEEE, pp. 1251-1255.

USPTO Office Action regarding U.S. Appl. No. 09/737,725, dated May 7, 2004.

USPTO Response to Office Action regarding U.S. Appl. No. 09/737,725, dated Sep. 13, 2004.

USPTO Final Office Action regarding U.S. Appl. No. 09/737,725, dated Oct. 18, 2004.

USPTO Response to Final Office Action regarding U.S. Appl. No. 09/737,725, dated Dec. 12, 2006.

USPTO Office Action regarding U.S. Appl. No. 09/737,725, dated Aug. 30, 2007.

USPTO Response to Office Action regarding U.S. Appl. No. 09/737,725, dated Nov. 26, 2007.

USPTO Office Action regarding U.S. Appl. No. 09/737,725, dated Dec. 19, 2007.

USPTO Response to Office Action regarding U.S. Appl. No. 09/737,725, dated Mar. 19, 2008.

USPTO Notice of Allowance regarding U.S. Appl. No. 09/737,725, dated Apr. 15, 2008.

* cited by examiner

NETWORK MANAGEMENT WITH PLATFORM-INDEPENDENT PROTOCOL INTERFACE FOR DISCOVERY AND MONITORING PROCESSES

This application is a continuation of application Ser. No. 09/737,725, filed Dec. 15, 2000, now U.S. Pat. No. 7,418,513 issued Aug. 26, 2008.

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and reach consistently the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support as many customers as possible within a single network management system. The service provider's profit margins may materialize from the ability to bill the usage of a common network management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system. By providing network management for each customer within an integrated system, a robust management system can enable a service provider to enter into quality-of-service (QOS) agreements with customers.

Hence, there is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art. The nodes can be geographically dispersed, and the overall computing environment can be managed in a distributed manner. The managed environment can be logically separated into a series of loosely connected managed regions, each with its management server for managing local resources. The management servers coordinate activities across the enterprise and permit remote site management and operation. Local resources within one region can be exported for the use of other regions.

Meeting quality-of-service objectives in a highly distributed system can be quite difficult. However, within a system that performs network management tasks for a million devices or more, a tremendous amount of computational resources throughout the system could be consumed for the managerial functions. When management activities are performed at a particular machine, a measurable amount of bandwidth could be consumed. In general, a customer does not want to experience a reduction in system performance, such as slower communication speeds, when a system is busy performing system management activities. Typical solutions for maintaining the bandwidth of the overall distributed system include increasing hardware resources throughout the network. However, solving one performance problem may introduce another problem.

A service provider should attempt to minimize the reduction of bandwidth that is caused by any system management activities. One manner of increasing bandwidth performance related to network management activities is to reduce the bandwidth requirements of the network management activities, although this technique cannot necessarily be applied without regard to the operation of other components within the machine. For example, a particular device may support a set of multiple protocols, and more than one protocol may provide certain functionality required by a particular component on the device to accomplish a particular network management task. However, each protocol may perform certain functions with less network traffic than other protocols, and bandwidth requirements for the device could be reduced by choosing the most appropriate protocol for the task from among the set of supported protocols.

Simple Network Management Protocol (SNMP) is a standard protocol that is used to administer management tasks on many currently available devices. SNMP can be difficult to integrate with other protocols, especially proprietary protocols. Current application frameworks, however, do not provide a platform-independent interface for certain network management processes, such as scanning protocols or discovery methods.

Therefore, it would be particularly advantageous to provide a method and system that provides a flexible, platform-independent scheme for network management tasks in a highly distributed system. It would be particularly advantageous for the network management system to provide a methodology for monitoring the status of endpoints using a variety of protocols.

SUMMARY OF THE INVENTION

A method, system, apparatus, and computer program product is presented for management of a distributed data processing system. An action at a target device is requested, and the completion of the action depends upon communication protocol operations on a set of devices along a logical route through the distributed data processing system. A set of supported protocols that are common to the set of devices along the logical route are identified, and a subset of supported protocols in the set of supported protocols that can be used to complete the action is then identified. An allowable supported protocol is selected for the action based on the type of requested action, after which the requesting application may use the action in accordance with the selected allowable supported protocol, e.g., to monitor or discover the target device. A topology mapping is used to derive an endpoint-to-endpoint route for completing the requested action. A comparison of assigned priorities of each allowable supported protocol may be performed to choose the selected allowable supported protocol.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
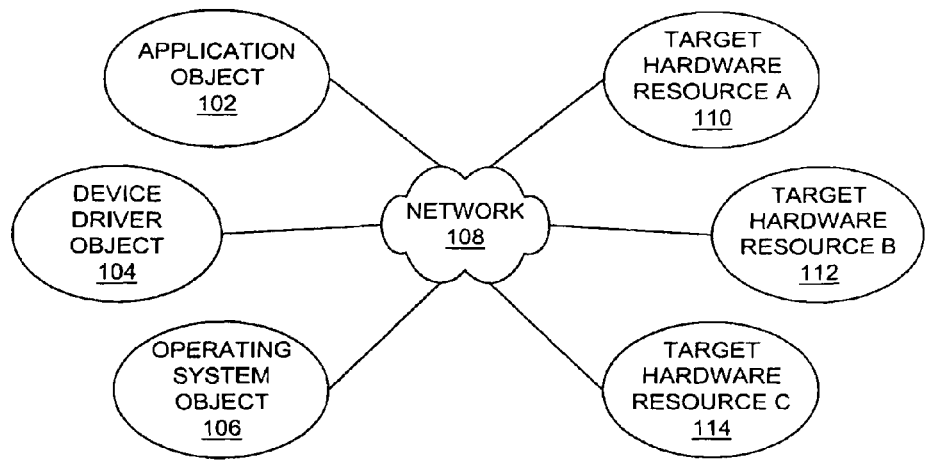
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110-114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
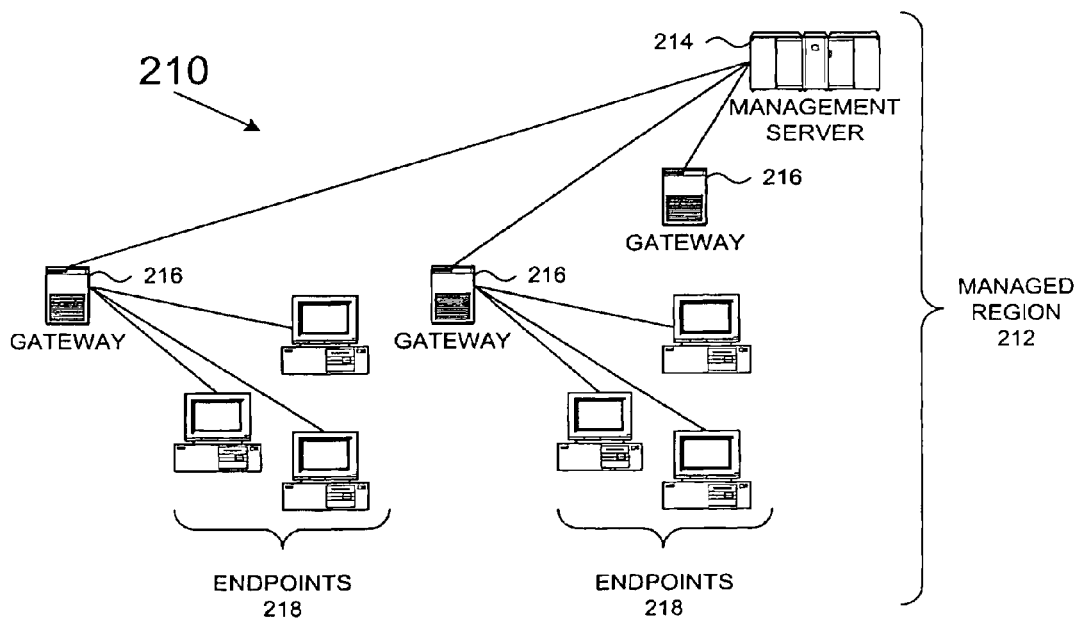
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
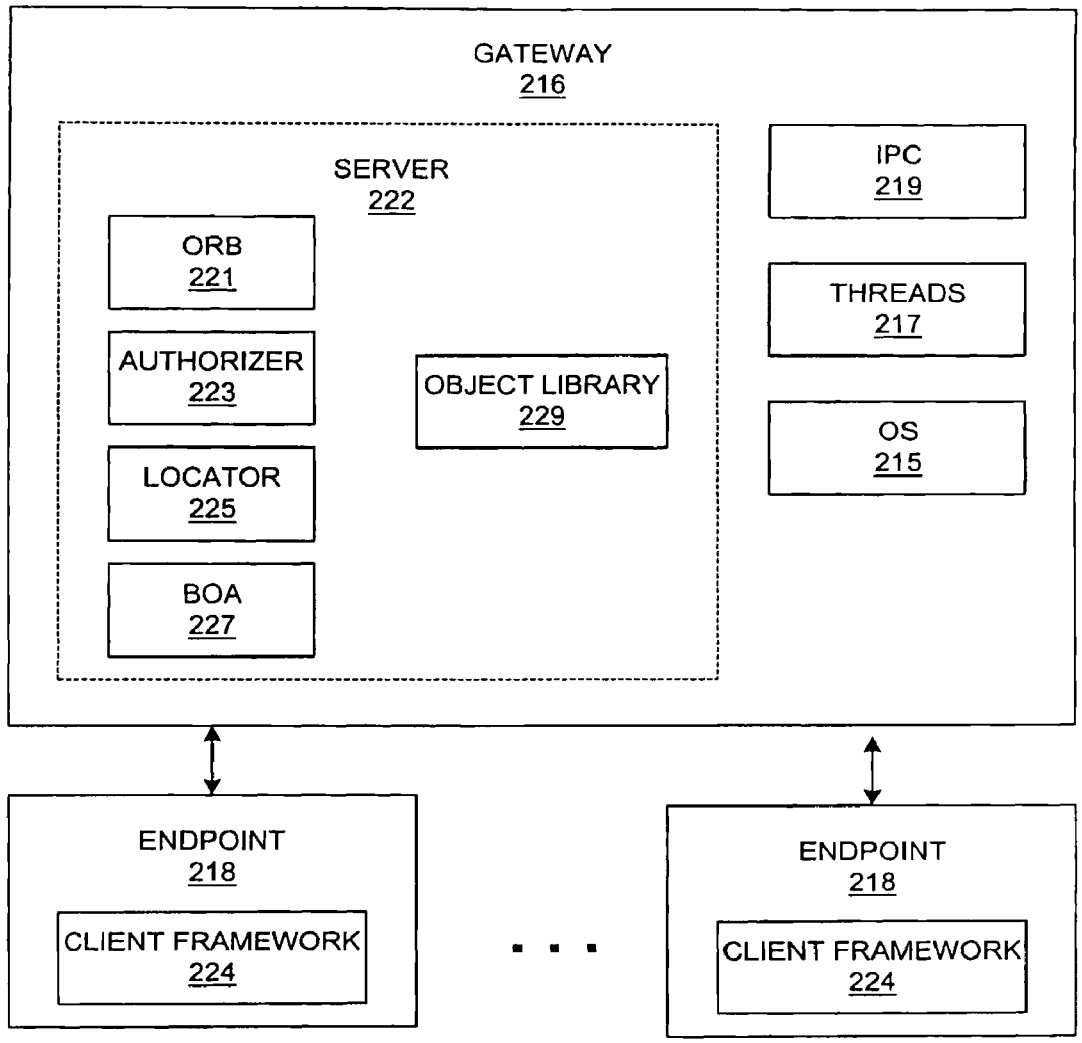
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadthwise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
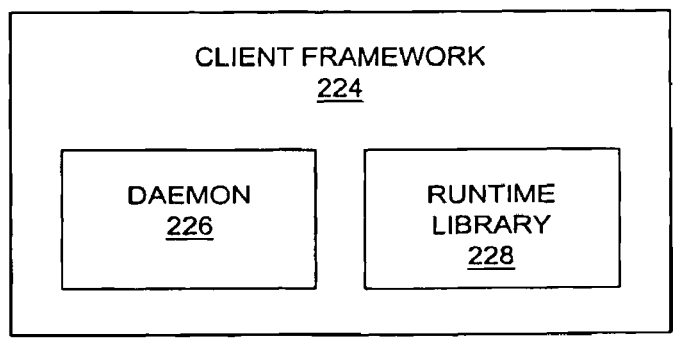
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Preferably, the server and each of the gateways is a distinct computer. For example, each computer may be a RISC System/6000™ (a reduced instruction set or so-called RISC-based workstation) running the AIX (Advanced Interactive Executive) operating system. Of course, other machines and/or operating systems may be used as well for the gateway and server machines.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

Figure 2D:
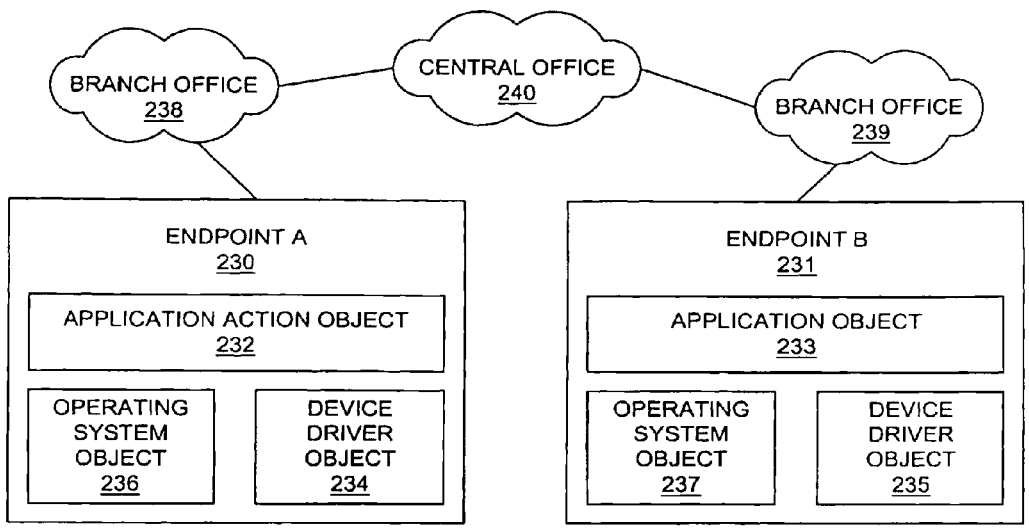
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234-235, and operating system objects 236-237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by in central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
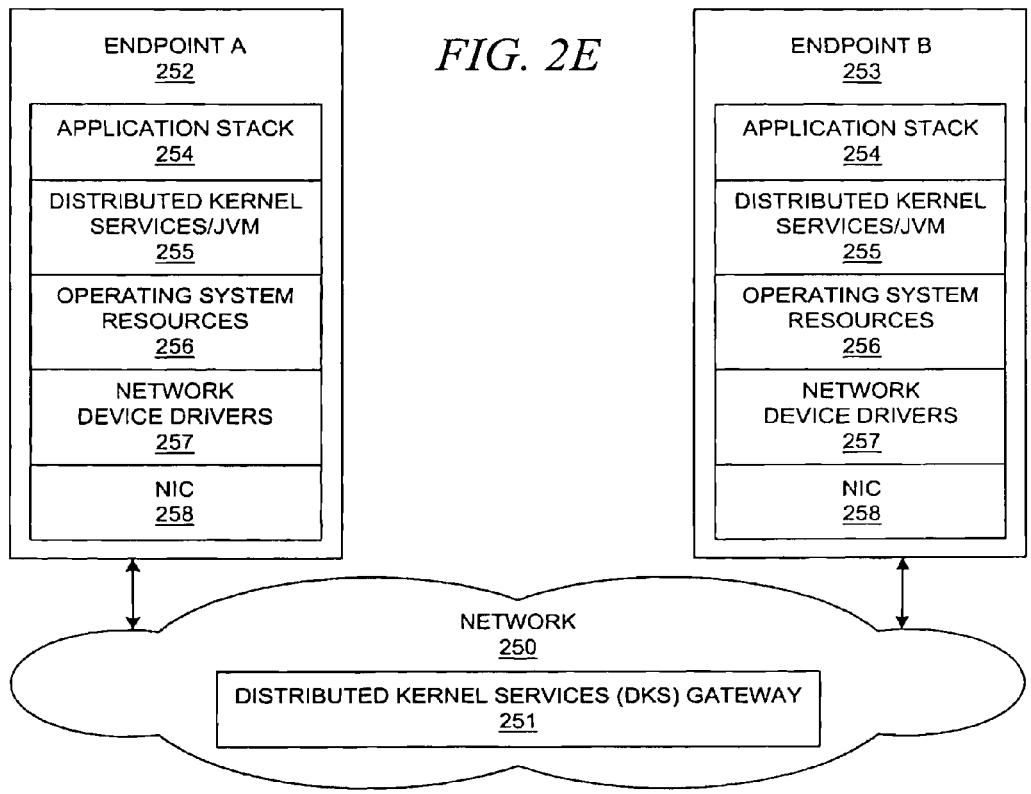
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
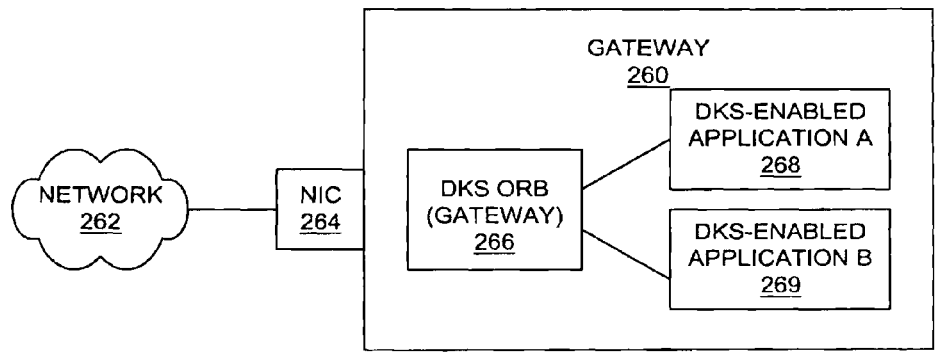
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
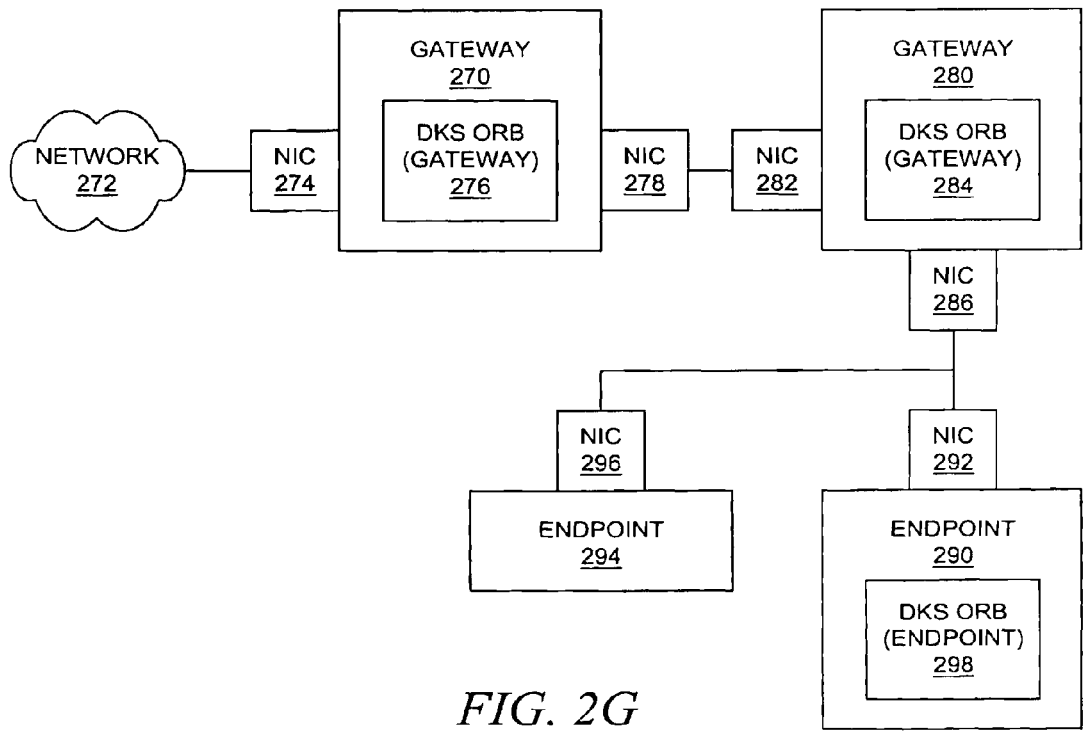
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
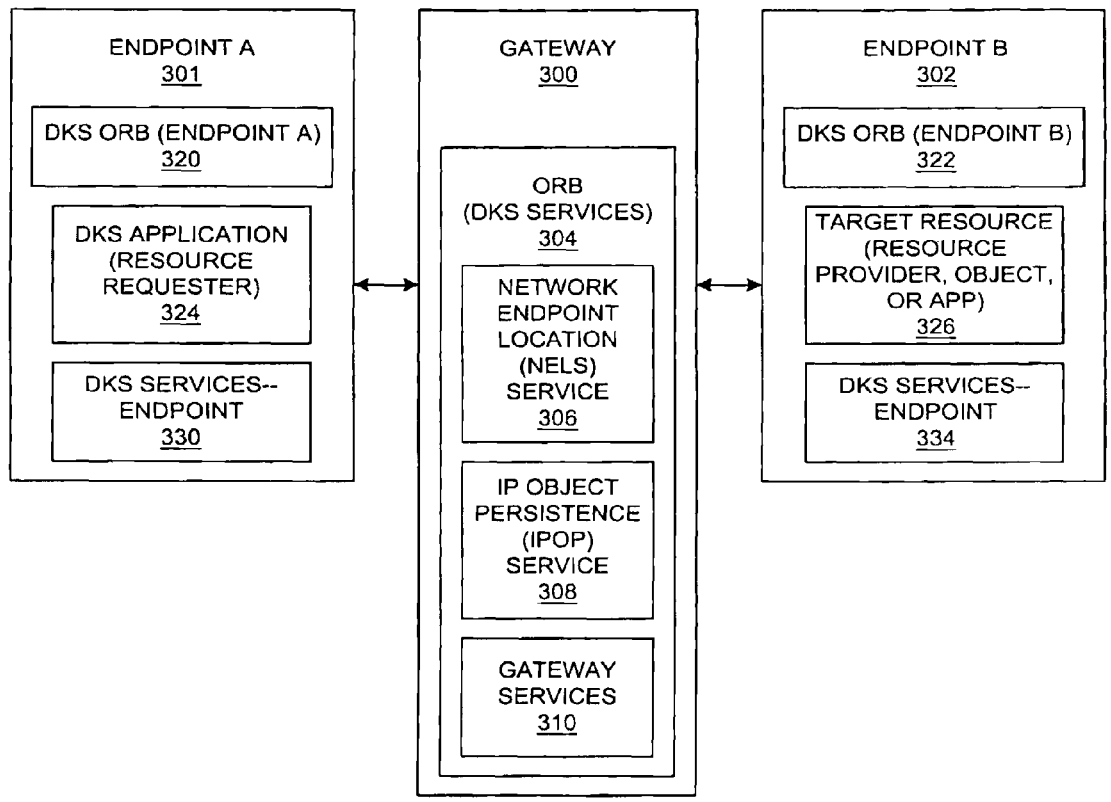
FIG. 3 is a block diagram depicting components within the system management framework that provide resource leasing management functionality within a distributed computing environment such as that shown in FIGS. 2D-2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NEL) 306, IP Object Persistence (IPOP) service 308, and Gateway Service 310.

The Gateway Service processes action objects, which are explained in more detail below, and directly communicates with endpoints or agents to perform management operations. The gateway receives events from resources and passes the events to interested parties within the distributed system. The NEL service works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP Service can be used directly by certain components and applications when higher performance is required or the location independence provided by the gateways and action objects is not desired. A Metadata Service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate command which are sent to gateways, and the applications wait for the return of the action object. Action objects contain all of the information necessary to run a command on a resource. The application does not need to know the specific protocol that is used to communicate with the resource. The application is unaware of the location of the resource because it issues an action object into the system, and the action object itself locates and moves to the correct gateway. The location independence allows the NEL service to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling managed object as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. AOIP objects are the primary vehicle that establishes a connection between an application and a designated IP endpoint using a gateway or stand-alone service. In addition, the Action Object SNMP (AOSnmp) Class is also a subclass of the Action Object Class. AOSnmp objects are the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NEL service; a mechanism by which the action object can use the ORB to transport itself to the selected gateway; a mechanism by which to communicate with the SNMP stack in a stand-alone mode; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An action object IP may be capable of running a command from inception or waiting for a future command. A program that creates an AOIP object must supply the following elements: address of endpoints; function to be performed on the endpoint, class, or object; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NEL service finds a route (data path) to communicate between the application and the appropriate endpoint. The NEL service converts input to protocol, network address, and gateway location for use by action objects. The NEL service is a thin service that supplies information discovered by the IPOP service. The primary roles of the NEL service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NEL service to resolve the network address and define the route to the endpoint in that network.

One of the following is passed to the action object to specify a destination endpoint: an EndpointAddress object; a fully decoded NetworkAddress object; and a string representing the IP address of the IP endpoint. In combination with the action objects, the NEL service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NEL service to have the flexibility to decide the best protocol to reach an endpoint. On return from the NEL service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NEL service determines which endpoints are managed by which gateways. When the appropriate gateway is identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the action object IP fails to execute an action object on the target gateway, NEL is consulted to identify an alternative path for the command. If an alternate path is found, the action object IP is transported to that gateway and executed. It may be assumed that the entire set of commands within one action object IP must fail before this recovery procedure is invoked.

Figure 4:
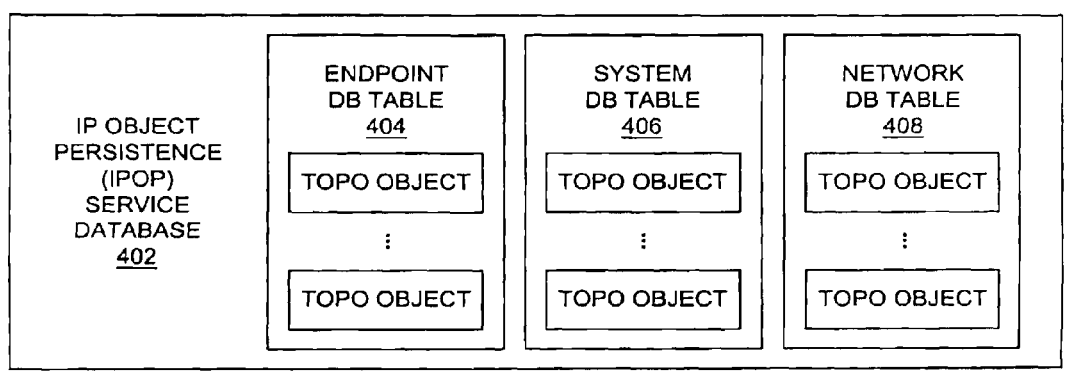
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological (topo) objects for facilitating the reservation of resources at IP endpoints and the execution of action objects. Information within IPOP service database 402 allows applications to generate action objects for resources previously identified as IP objects through a discovery process across the distributed computing environment. FIG. 4 merely shows that the topo objects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
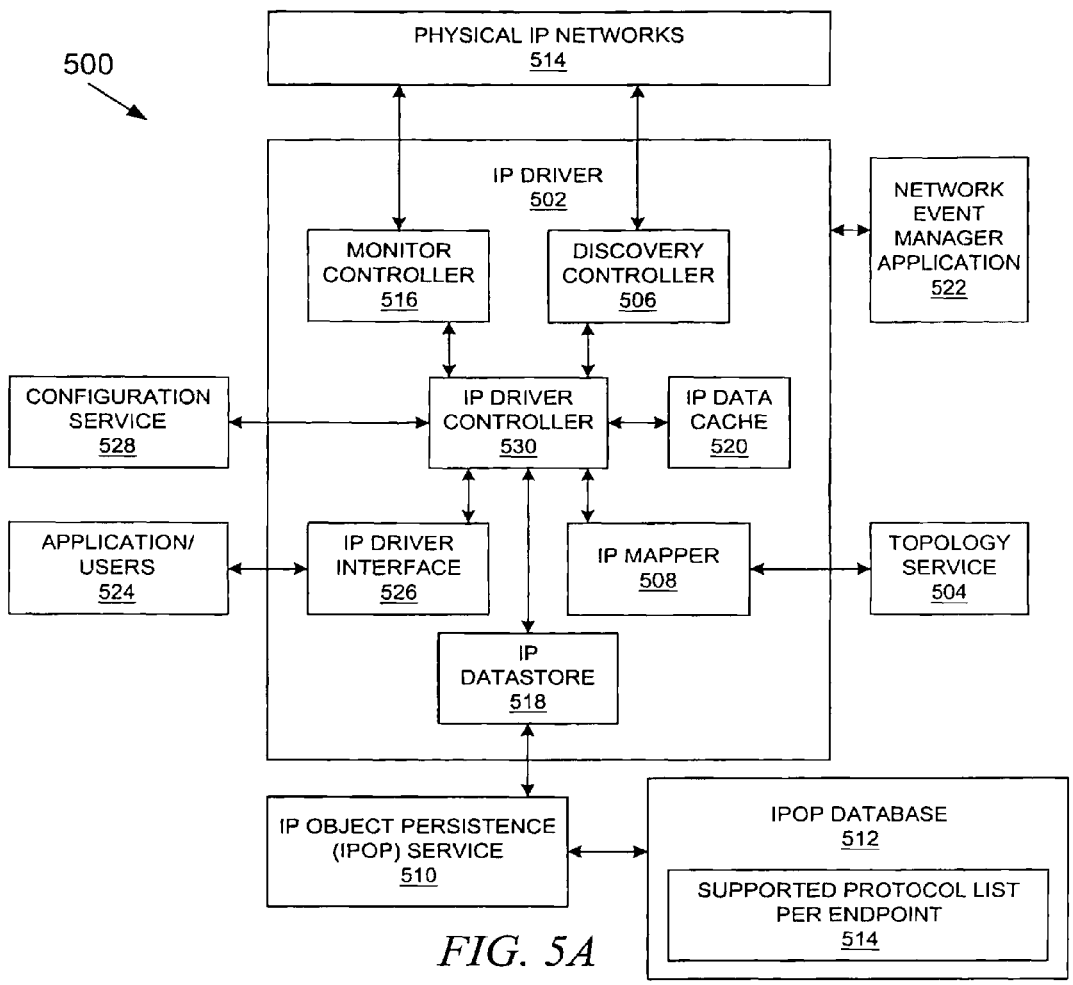
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within Topology Service 504, which can serve may than one IP driver. Topology Service 504 stores topology information obtained from discovery controller 506. The information stored within the Topology Service may include graphs, arcs, and the relationships between nodes determined by IP mapper 508. Users can be provided with a GUI to navigate the topology, which can be stored within a database within the Topology Service.

IPOP service 510 provides a persistent repository 512 for discovered IP objects; persistent repository 512 contains attributes of IP objects without presentation information and also stores supported protocol lists for endpoints 540, as discussed in more detail further below with respect to FIGS. 6A-6D. Discovery controller 506 detects IP objects in Physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 532 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP Service manages discovered IP objects; to do so, the IPOP Service uses a distributed database in order to efficiently service query requests by a gateway to determine routing, identity, or a variety of details about an endpoint. The IPOP Service also services queries by the Topology Service in order to display a physical network or map them to a logical network, which is a subset of a physical network that is defined programmatically or by an administrator. IPOP fault tolerance is also achieved by distribution of IPOP data and the IPOP Service among many Endpoint ORBs.

The IP Monitor Controller uses SNMP polls to determine if there have been any configuration changes in an IP system. It also looks for any IP endpoints added to or deleted from an IP system. The IP Monitor Controller also monitors the statuses of IP endpoints in an IP system. In order to reduce network traffic, an IP driver will use SNMP to get the status of all IP endpoints in an IP system in one query unless an SNMP agent is not running on the IP system. Otherwise, an IP driver will use "Ping" instead of SNMP. An IP driver will use "Ping" to get the status of an IP endpoint if it is the only IP endpoint in the system since the response from "Ping" is quicker than SNMP.

One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e., if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique in across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network ID.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The Configuration Service provides the services to allow the DKS components to store and retrieve configuration information for a variety of other services from anywhere in the networks. In particular, the scope configuration will be stored in the Configuration Services so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a Gateway. The system address is the address of one of the NICs that is used to make SNMP queries. A user interface can be provided, such as an administrator console, to write scope information into the Configuration Service. System administrators do not need to provide this information at all, however, as the IP drivers can use default values.

An IP driver gets its scope configuration information from the Configuration Service, which may be stored using the following format: scopeID=driverID,anchorname,subnetAddress:subnetMask[:privateNetworkId:privateNetworkName:subnetPriority][, subnetAddress:subnetMask:privateNetworkId:privateNetworkName:subnetPriority]]

Typically, one IP driver manages only one scope. Hence, the "scopeID" and "driverID" would be the same. However, the configuration can provide for more than one scope managed by the same driver. "Anchorname" is the name in the name space in which the Topology Service will put the IP networks objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the Configuration Service would be:
2=2,ip,147.0.0.0:255.254.0.0,146.100.0.0:255.255.0.0, 69.0.0.0:255.0.0.0.

| Subnet address | Subnet mask |
| --- | --- |
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
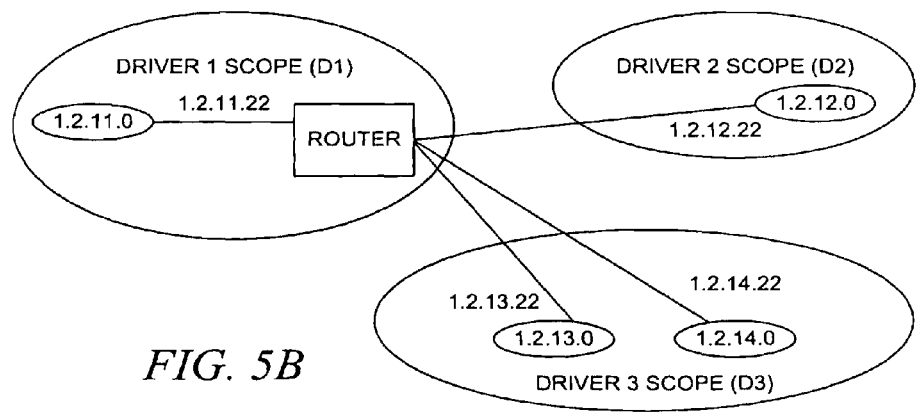
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the Topology Service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various data bases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. Based on the scopes, an IP driver can partition all IP networks, IP Systems, and IP endpoints into different scopes. A network and all its IP endpoints will always be assigned in the same scope. However, a router may be assigned to an IP Driver, but some of its interfaces are assigned to different to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver. Because of the inter-scope association, when the IP Persistence Service (IPOP) is queried to find all the IP endpoints in system, it will have to search not only IP endpoints with the system ID but also IP endpoints with its system name. If a distributed IP Persistence Service is implemented, the IP Persistence Service has to provide extra information for searching among IP Persistence Services.

As noted above, in the DKS environment, an application requests the creation of an action object that encapsulates a command that is sent to a gateway, and the application waits for the return of the action object's completion. Action objects generally contain all of the information necessary to run a command on a resource. The application does not necessarily need to know the specific protocol that is used to communicate with the resource. Moreover, the application may be unaware of the location of the resource because it issues an action object into the system, and the action object itself locates and moves to the correct gateway.

For example, an application requires a target resource (target endpoint) to be located. The target object is ultimately known within the DKS space using traditional network values, i.e. a specific network address and a specific protocol identifier. However, an application can address a target object with an Object ID. An action object is generated on behalf of an application to resolve the network location of an endpoint. The action object asks the NEL service to resolve the network address and define the route to the endpoint in that network. One benefit of location independence is that the NEL service can balance the load between gateways independently of the applications and also allows the gateways to handle resources or endpoints that move or need to be serviced by another gateway.

In order to fulfill quality-of-service guarantees within a network management system, which might consist of a million devices or more, a service provider may desire to optimize its use of network bandwidth resources. As noted previously, one manner of increasing bandwidth performance related to network management activities is to reduce the bandwidth requirements of the network management activities. For example, a particular device may support a set of multiple protocols, and more than one protocol may provide certain functionality required by a particular component on the device to accomplish a particular network management task. However, each protocol may perform certain functions with less network traffic than other protocols, and bandwidth requirements for the device could be reduced by choosing the most appropriate protocol for the task from among the set of supported protocols. Simple Network Management Protocol (SNMP) is a standard protocol that is used to administer management tasks on many currently available devices. However, SNMP can be difficult to integrate with other protocols, especially proprietary protocols, and current application frameworks do not provide a platform-independent interface for certain network management processes, such as scanning protocols or discovery methods.

In contrast, the present invention provides a flexible, platform-independent scheme for network management tasks in a highly distributed system. The network management system contains a methodology for monitoring the status of endpoints using a variety of protocols. These features are explained in more detail below with respect to FIGS. 6A-6D.

Figure 6A:
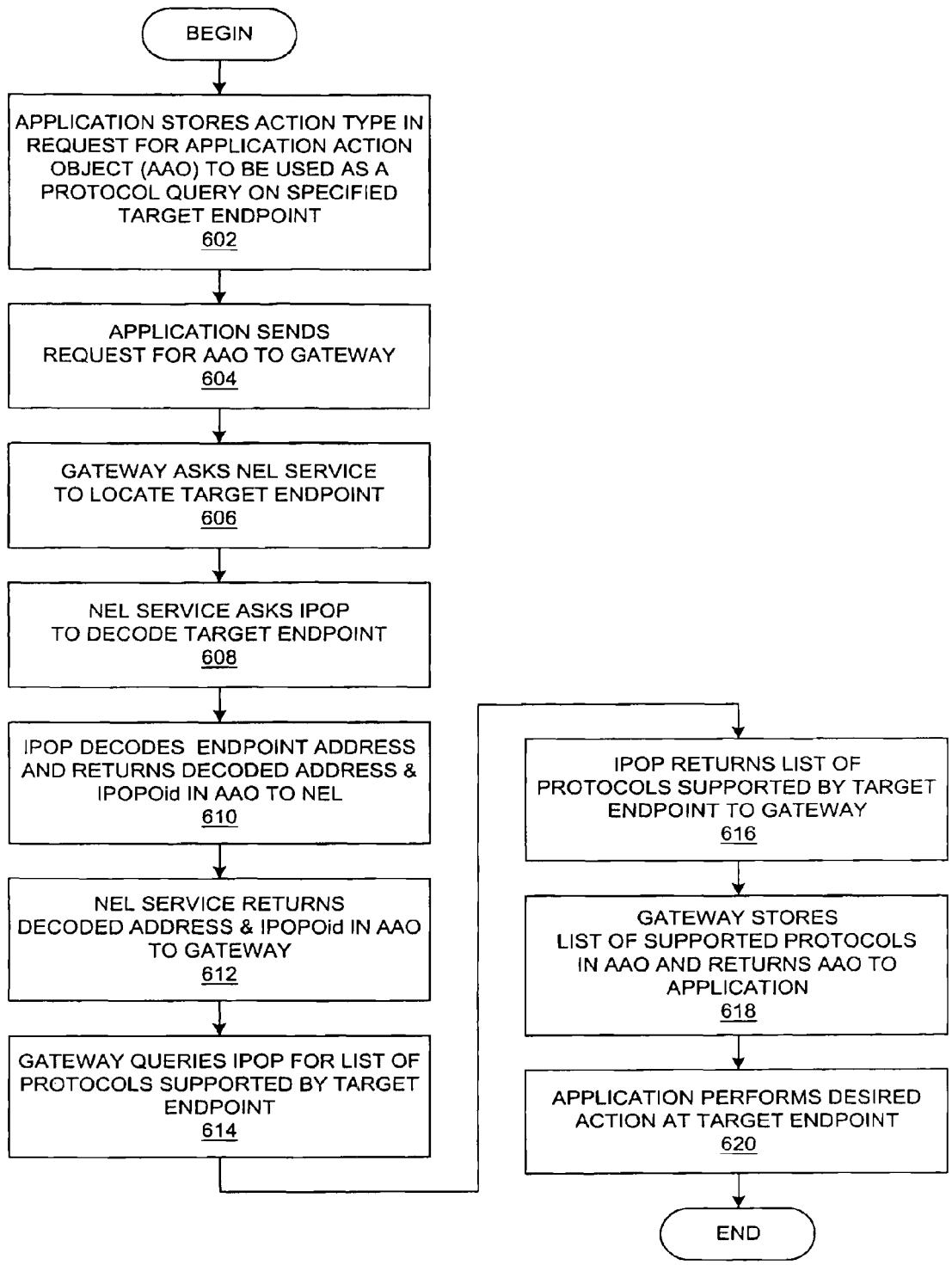
FIG. 6A is a flowchart depicting a process for obtaining and using an application action object (AAO) for a protocol query within the network management system of the present invention.

With respect to FIG. 6A, a flowchart depicts a process for obtaining and using an application action object (AAO) for a protocol query within the network management system of the present invention. An application action object is a class of objects that extends an action object class in a manner that is appropriate for a particular application. The process begins when an application, pursuant to communicating with an endpoint, stores an action type in a request for an application action object (AAO) to be used as a protocol query on a specified target endpoint (step 602). The application then sends the request for an application action object to the Gateway service (step 604).

It should be noted that aspects of the process shown in FIG. 6A are generic with respect to an application requesting and obtaining action objects. However, given the processing context shown in FIGS. 6A-6C, it may be assumed that the requested AAO in step 604 is a special type of AAO that requires that the network management system interpret the AAO as a protocol query.

Figure 6B:
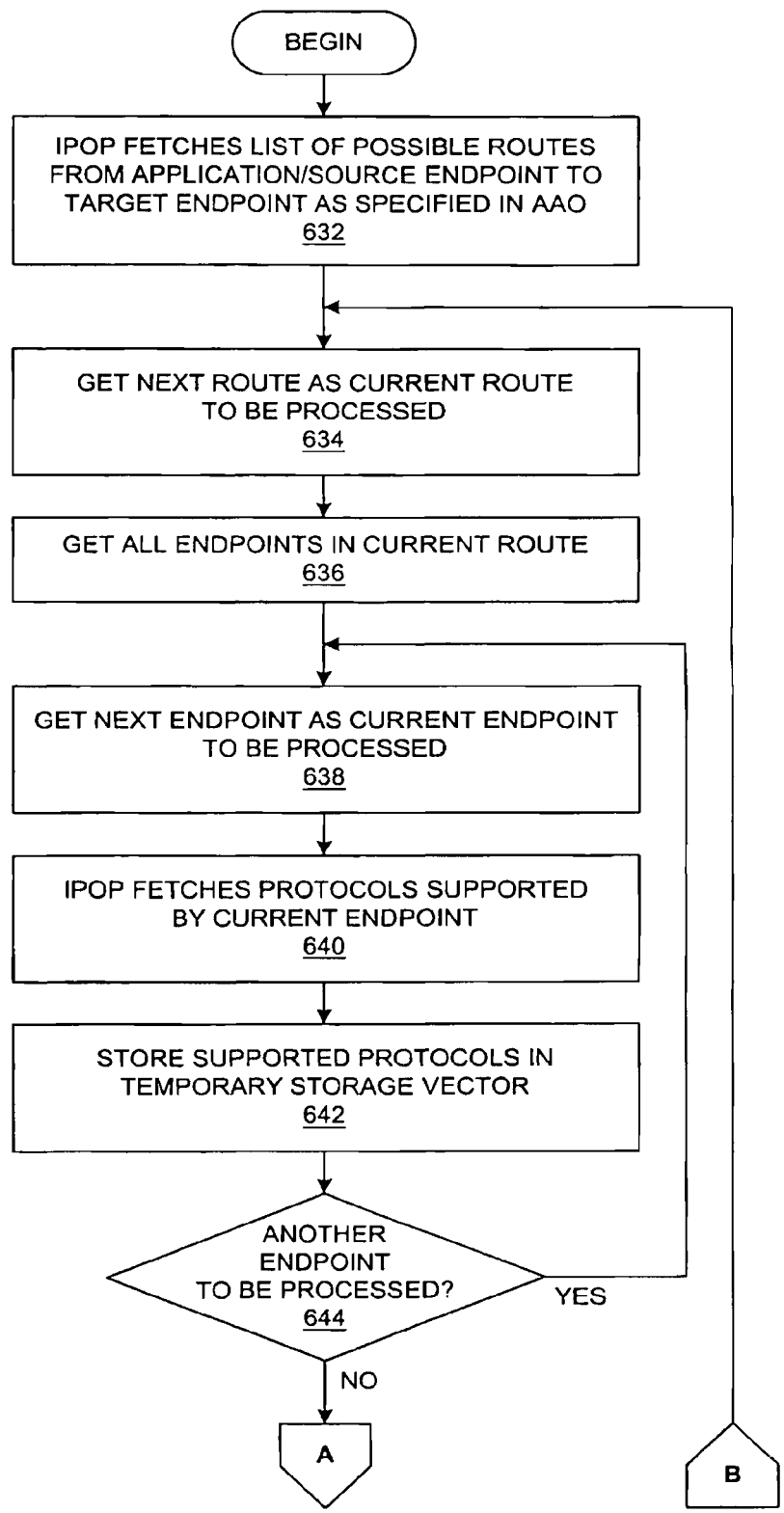
FIGS. 6B-6C are a set of flowcharts depicting a process by which IPOP determines which routes may be used for a given AAO, the protocols that are supported by the endpoints along those routes, and the supported protocols that are appropriate for the given requested action.
Figure 6C:
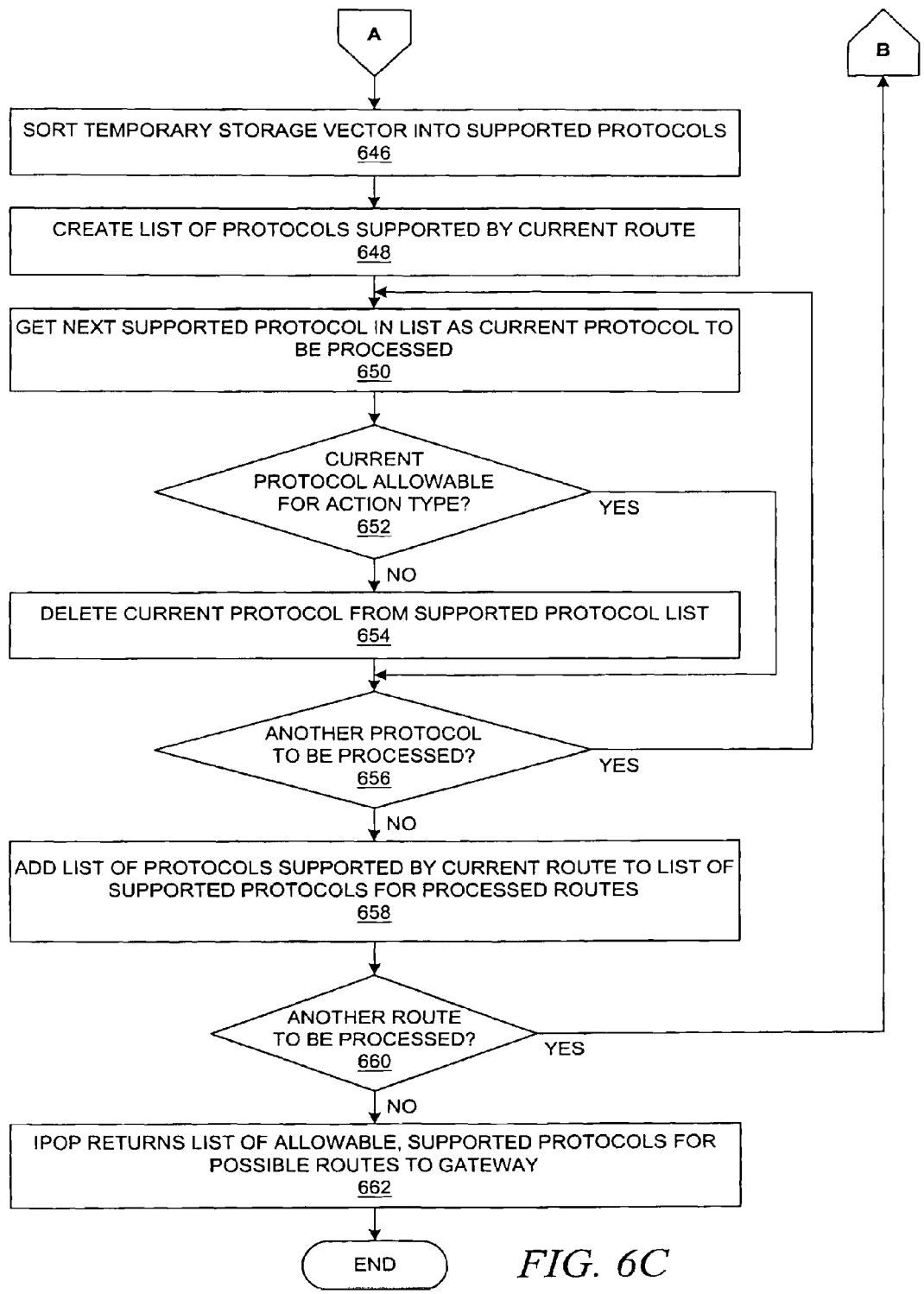

The present invention provides a methodology through which a network management framework presents a platform-independent protocol interface. The initial request for the AAO does not require that a protocol must be specified for its proper implementation or proper execution. Depending upon the system implementation, there may be several types of protocols for which DKS will provide support. For example, one special type of application action object would be an action that requests execution by SNMP while another AAO might request execution by a proprietary protocol. As shown in FIGS. 6A-6C, a particular request for an instance of an action object can specify a type of action object that queries for supported protocols prior to requesting that an action be performed in accordance with a particular protocol.

Referring again to FIG. 6A, the process continues when the gateway service asks the NEL service to locate the target endpoint in the request (step 606). As noted previously, one of the primary roles of the NEL service is to support the requests from applications for endpoint processing, as explained above with respect to FIG. 3. The NEL service then asks the IPOP service to decode the endpoint object (step 608). Assuming that the processing has been successfully accomplished, IPOP decodes the endpoint address and returns a decoded address and IPOPOid in an appropriate AAO to the NEL service (step 610), and the NEL service returns the AAO to the gateway service (step 612).

The gateway service then queries the IPOP persistent storage for a list of protocols that are supported by the target endpoint and that are appropriate for the requested action (step 614). In response, IPOP then returns a list of allowable, supported protocols for the target endpoint (step 616). The gateway service then stores the list of allowable, supported protocols in the AAO and returns the AAO to the application (step 618). The application then performs the desired action (step 620), such as a monitoring operation against the target endpoint, and the process is complete.

With respect to FIGS. 6B-6C, a set of flowcharts depict a process by which IPOP determines which routes may be used for a given AAO, the protocols that are supported by the endpoints along those routes, and the supported protocols that are appropriate for the given requested action. FIGS. 6B-6C provide more detail for the processing that occurs within IPOP to accomplish step 616 shown in FIG. 6A.

The process begins with IPOP receiving the request from the gateway service for a list of possible protocols that may be used as required to execute the requested AAO, after which IPOP fetches a list of possible routes from the application or source endpoint to the target endpoint as specified in the given AAO (step 632). The list of routes may be derived from a network topology mapping stored within IPOP. In order to loop through the list of routes, a next route from the list of routes is selected to be processed as a current route within the subsequent steps (step 634). IPOP then retrieves all endpoints that comprise the current route (step 636) in order to loop through the endpoints.

A next endpoint from the list of endpoints in the route is selected to be processed as a current endpoint within the subsequent steps (step 638). IPOP retrieves the protocols that are supported by the current endpoint (step 640) and stores the retrieved endpoints in association with the endpoints in a temporary storage vector (step 642). A determination is then made as to whether there is another endpoint to be processed for the current route (step 644), and if so, then the process branches back to step 638 to retrieve the next endpoint.

After all of the protocols for all of the endpoints for the current route have been retrieved, then they are sorted within the temporary storage vector (step 646). A list of supported protocols for the current route is then created (step 648). A sort of the supported protocols is accomplished by comparing the supported protocols and determining which protocols are common to each endpoint in the list.

The process then loops through the new list of supported protocols. A next supported protocol in the new list is retrieved as a current protocol to be processed in the following steps (step 650). A determination is then made as to whether the current protocol is allowable for, i.e. supports, the action type previously specified by the application in the request for the AAO (step 652). If not, then the current protocol is deleted from the list of supported protocols (step 654). If the protocol is appropriate for the given action type, then the protocol remains in the list.

A determination is made as to whether there is another protocol in the supported protocol list to be processed (step 656), and if so, then the process branches back to step 650 to obtain check another protocol. If the entire list has been processed, then the list of supported protocols for the endpoints in the current route contains only those protocols which are allowed for the requested action type, and the list is added to a list of allowable and supported protocols from previously processed routes (step 658).

A determination is then made as to whether there is another route in the list of potential routes for the AAO to be processed (step 660), and if so, the process branches back to step 634 to process another possible route. If all of the routes have been processed, then IPOP has determined a list of allowable, supported protocols for all possible routes for the requested AAO directed to the specified target endpoint, and this list is returned to the gateway service (step 662). The process of determining the list of allowable, supported protocols within IPOP is then complete.

Figure 6D:
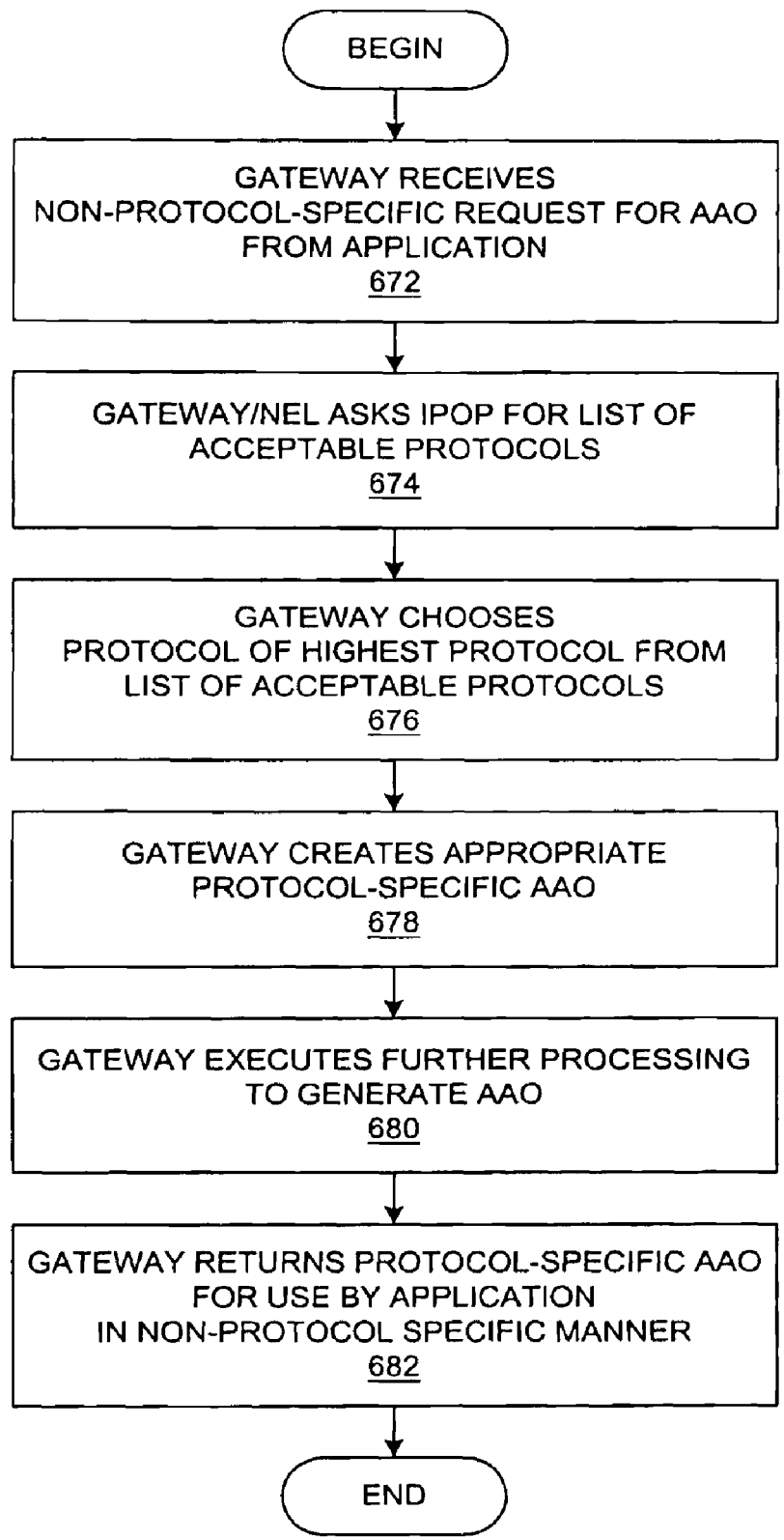
FIG. 6D is a flowchart depicting a process for a protocol-independent request for an application action object.

With respect to FIG. 6D, a flowchart depicts a process for a protocol-independent request for an application action object. The process begins with the gateway service receiving a non-protocol specific request for an AAO (step 672). In response, the gateway service and the NEL service request that IPBP provide a list of acceptable protocols for the requested AAO (step 674), which may be accomplished in the manner described above with respect to FIGS. 6B-6C and returned to the gateway service.

The gateway service then chooses the protocol of the highest priority from the list of allowable, supported protocols (step 676). The priority amongst protocols for a particular type of action may be specified by an administrator as a configuration parameter, as shown with respect to FIG. 7 described below. Alternatively, other methods of determining a most desirable protocol may be incorporated. The gateway service then creates an appropriate protocol-specific AAO (step 678) and uses this protocol-specific AAO created within step 676 to perform any additional processing such as the routing of the action (step 680). Alternatively, another method would be to incorporate a "getProtocolSpecificAAO( . . . )" method within the AAO that the application could use to ask the gateway to create this object on its behalf. After returning the AAO to the originally requesting application, the application can then use the protocol-specific AAO in a non-protocol specific manner (step 682). Basically, the application is performing actions in a protocol-independent way, especially since the application did not originally specify a protocol to be used when generating the AAO. If desired or necessary, then the application can determine the protocol around which the AAO was generated by examining the type or class of the generated AAO.

Figure 7:
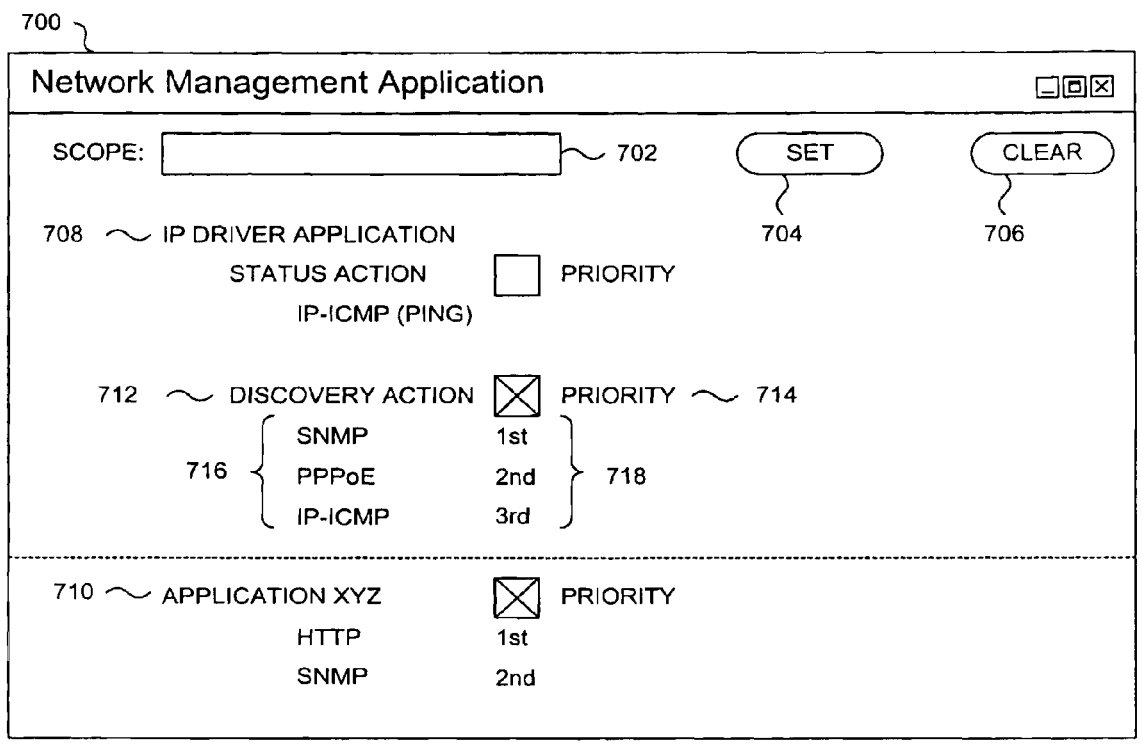
FIG. 7 is a diagram showing a window within a graphical user interface of a network or system management application that allows an administrator to set priorities for protocols with respect to types of monitoring and discovery actions in accordance with a preferred embodiment of the present invention.

With reference now to FIG. 7, a diagram shows a window within a graphical user interface of a network or system management application that allows an administrator to set priorities for protocols with respect to types of monitoring and discovery actions in accordance with a preferred embodiment of the present invention. Window 700 allows an administrator to map priorities for protocols between application actions on endpoints and allowed protocols. An administrator can use the GUI to establish a priority mapping between protocols and networks, scopes, and/or single endpoints, as necessary. Entry field 702 accepts a scope identifier to be associated with a particular priority mapping, which allows an administrator to specify different mappings for different scopes. The GUI could include an appropriate method for allowing the administrator to select a scope, such as placing available scopes as menu items within a drop-down menu. In addition, the GUI may be implemented to allow an administrator to specify a set of scopes; it should be noted that a scope may include a single endpoint, a set of endpoints within a single network, a set of endpoints over multiple networks, or a set of networks. In this manner, an administrator may configure different mappings for different customers in different managed regions.

"Set" button 704 and "Clear" button 706 allow the administrator to store the specified values within a configuration service or to clear the specified parameters. The priorities among a set of protocols may be specified for different applications, as shown by specified applications 708 and 710. Again, the GUI could include an appropriate method for allowing the administrator to select an application or other types of data items, such as placing available applications or data items as menu items within a drop-down menu.

A set of actions that can be performed by a particular application is shown in association with an application, such as action 712. The administrator may specify that a priority scheme among protocols should be used for a particular action, e.g., by using check box 714. A set of protocols that are appropriate or allowable for a particular action is also presented within window 700, such as protocol list 716. Each protocol in protocol list 716 has an associated priority 718. The priority may be used within a process that selects allowable, supported protocols for actions requested by application, as discussed above with respect to FIGS. 6B-6C.

The advantages of the present invention should be apparent in view of the detailed description of the invention that is provided above. In prior art systems, SNMP can be used for network management tasks, but certain tasks under SNMP require significant network traffic. In addition, prior art systems do not provide a platform-independent protocol interface. In contrast, the present invention provides a platform-independent protocol interface that could include future development of other protocols. If desired by a particular system application, network management tasks, such as monitoring and discovering devices, can be performed without regard to a particular protocol that is used to perform the task. In addition, a network management application could use the protocol-independent interface to discover which protocols are supported by a particular device or set of devices. For example, rather than being hard-coded with configuration information about particular devices, or rather than relying on a configuration service to distribute configuration information about particular devices, a discovery controller or monitor controller can use the interface to discover the protocols that are supported by the particular devices with which the discovery controller or monitor controller is responsible for interacting. As another example, a firewall application can use the interface to determine which protocols are permitted by certain networks. In effect, the protocols that are supported by a given endpoint are available for dynamic determination by interested applications.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An apparatus for managing devices within a distributed data processing system, the apparatus comprising:
   a processor unit connected to a network; and
   a memory coupled to the processor unit and having stored therein instructions that are readable by the processor unit for controlling the processor unit to:
   configure a set of priorities for a set of communication protocols, wherein a user interactively assigns a priority in the set of priorities to a communication protocol in the set of communication protocols, establishing a scheme for prioritizing each protocol among the set of communication protocols;
   receive a request for a requested action at a requested target device within the distributed data processing system, wherein completion of the requested action depends upon communication protocol operations on each of a set of multiple devices along a route through the distributed data processing system to the requested target device, wherein the route defines a path through each device of the set of multiple devices for sending requests from a source device, where the requested action originated from, to the requested target device;
   identify a set of multiple supported protocols that are common to the set of multiple devices along the route;
   determine a set of multiple allowable supported protocols in the set of multiple supported protocols based on the requested action, wherein the set of multiple allowable supported protocols is a subset of the set of multiple supported protocols, and wherein each protocol in the set of multiple allowable supported protocols is usable to complete the requested action;
   select, in response to a determination of the set of multiple allowable supported protocols, an allowable supported protocol for the requested action from the set of multiple allowable supported protocols, wherein selecting the allowable supported protocol for the requested action from the set of multiple allowable supported protocols comprises comparing priorities of each allowable supported protocol in the set of multiple allowable supported protocols to determine an allowable supported protocol that has a highest priority among the set of multiple allowable supported protocols, and selecting the allowable supported protocol that has a highest priority among the set of multiple allowable supported protocols to form a selected allowable supported protocol; and
   grant the request for the requested action in accordance with the selected allowable supported protocol.

2. The apparatus of claim 1 wherein the scheme is based on an action type for requestable actions.

3. The apparatus of claim 1 wherein the scheme is based on an application type for requesting applications.

4. The apparatus of claim 1 wherein an action type of the requested action is a protocol query requesting a list of allowable supported protocols for the requested target device.

5. The apparatus of claim 1 wherein the memory coupled to the processor unit further comprises instructions that are readable by the processor unit for controlling the processor unit to:
monitor the requested target device using the granted action request in accordance with the selected allowable supported protocol.

6. The apparatus of claim 1 wherein the memory coupled to the processor unit further comprises instructions that are readable by the processor unit for controlling the processor unit to:
discover the requested target device using the granted action request in accordance with the selected allowable supported protocol.

7. A computer program product comprising a computer-readable, tangible storage device and computer-readable program instructions stored on the computer-readable, tangible storage device for use in a data processing system for managing devices within a distributed data processing system, the computer-readable program instructions, when executed by a CPU perform steps including:
configuring a set of priorities for a set of communication protocols, wherein a user interactively assigns a priority in the set of priorities to a communication protocol in the set of communication protocols, establishing a scheme for prioritizing each protocol among the set of communication protocols;
receiving a request for a requested action at a requested target device within the distributed data processing system, wherein completion of the requested action depends upon communication protocol operations on each of a set of multiple devices along a route through the distributed data processing system to the requested target device, wherein the route defines a path through each device of the set of multiple devices for sending requests from a source device, where the requested action originated from, to the requested target device;
identifying a set of multiple supported protocols that are common to the set of multiple devices along the route;
determining a set of multiple allowable supported protocols in the set of multiple supported protocols based on the requested action, wherein the set of multiple allowable supported protocols is a subset of the set of multiple supported protocols, and wherein each protocol in the set of multiple allowable supported protocols is usable to complete the requested action;
selecting, in response to a determination of the set of multiple allowable supported protocols, an allowable supported protocol for the requested action from the set of multiple allowable supported protocols, wherein the steps for selecting the allowable supported protocol for the requested action from the set of multiple allowable supported protocols comprises comparing priorities of each allowable supported protocol in the set of multiple allowable supported protocols to determine an allowable supported protocol that has a highest priority among the set of multiple allowable supported protocols, and selecting the allowable supported protocol that has a highest priority among the set of multiple allowable supported protocols to form a selected allowable supported protocol; and
instructions for granting the request for the requested action in accordance with the selected allowable supported protocol.

8. The computer program product of claim 7 wherein the scheme is based on an action type for requestable actions.

9. The computer program product of claim 7 wherein the scheme is based on an application type for requesting applications.

10. The computer program product of claim 7 wherein the scheme is based on an action type for requestable actions and on an application type for requesting applications.

11. The computer program product of claim 7 wherein an action type of the requested action is a protocol query requesting a list of allowable supported protocols for the requested target device.

12. The computer-readable program instructions of claim 7, when executed by the CPU perform steps further including:
monitoring the requested target device using the granted action request in accordance with the selected allowable supported protocol.

13. The computer-readable program instructions of claim 7, when executed by the CPU perform steps further including:
discovering the requested target device using the granted action request in accordance with the selected allowable supported protocol.

14. An apparatus for managing devices within a distributed data processing system, the apparatus comprising:
means for configuring a set of priorities for a set of communication protocols, wherein a user interactively assigns a priority in the set of priorities to a communication protocol in the set of communication protocols, establishing a scheme for prioritizing each protocol among the set of communication protocols;
means for receiving a request for a requested action at a requested target device within the distributed data processing system, wherein completion of the requested action depends upon communication protocol operations on each of a set of multiple devices along a route through the distributed data processing system to the requested target device, wherein the route defines a path through each device of the set of multiple devices for sending requests from a source device, where the requested action originated from, to the requested target device;
means for identifying a set of multiple supported protocols that are common to the set of multiple devices along the route;
means for determining a set of multiple allowable supported protocols in the set of multiple supported protocols based on the requested action, wherein the set of multiple allowable supported protocols is a subset of the set of multiple supported protocols, and wherein each protocol in the set of multiple allowable supported protocols is usable to complete the requested action;
means for selecting, in response to a determination of the set of multiple allowable supported protocols, an allowable supported protocol for the requested action from the set of multiple allowable supported protocols, wherein selecting the allowable supported protocol for the requested action from the set of multiple allowable supported protocols comprises comparing priorities of each allowable supported protocol in the set of multiple allowable supported protocols to determine an allowable supported protocol that has a highest priority among the set of multiple allowable supported protocols, and selecting the allowable supported protocol that has a highest priority among the set of multiple allowable supported protocols to form a selected allowable supported protocol; and
means for granting the request for the requested action in accordance with the selected allowable supported protocol.

* * * * *